United States Patent
Locker et al.

(10) Patent No.: US 8,446,372 B2
(45) Date of Patent: May 21, 2013

(54) APPARATUS, SYSTEM, AND METHOD FOR AUTOMATED TOUCHPAD ADJUSTMENTS

(75) Inventors: Howard Locker, Cary, NC (US); James Joseph Thrasher, Efland, NC (US); Jennifer Greenwood Zawacki, Hillsborough, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 747 days.

(21) Appl. No.: 12/170,284

(22) Filed: Jul. 9, 2008

(65) Prior Publication Data

US 2010/0007612 A1    Jan. 14, 2010

(51) Int. Cl.
*G06F 3/041* (2006.01)

(52) U.S. Cl.
USPC ........... 345/173; 345/156; 345/178; 345/619; 178/18.01; 178/18.03; 178/18.05; 178/18.06; 178/18.07

(58) Field of Classification Search
USPC ................. 345/173, 174, 156, 172, 178, 619, 345/634; 178/18.01–18.09, 18.11, 19.01–19.07
See application file for complete search history.

(56) References Cited

U.S. PATENT DOCUMENTS

| | | | | |
|---|---|---|---|---|
| 5,748,185 A | * | 5/1998 | Stephan et al. | 345/173 |
| 2005/0159948 A1 | * | 7/2005 | Roth et al. | 704/233 |
| 2006/0214921 A1 | * | 9/2006 | Takahashi et al. | 345/173 |
| 2006/0267951 A1 | * | 11/2006 | Rainisto | 345/173 |
| 2008/0036743 A1 | * | 2/2008 | Westerman et al. | 345/173 |

* cited by examiner

*Primary Examiner* — Lun-Yi Lao
*Assistant Examiner* — Insa Sadio
(74) *Attorney, Agent, or Firm* — Kunzler Law Group, PC

(57) ABSTRACT

An apparatus, system, and method are disclosed for automated touchpad adjustments. A Touchpad Corrective Action (TCA) detection module detects a TCA within a specified input limit after a touchpad input. An adjustment module decreases a touchpad sensitivity in response to detecting the TCA.

19 Claims, 6 Drawing Sheets

APPARATUS, SYSTEM, AND METHOD FOR AUTOMATED TOUCHPAD ADJUSTMENTS

BACKGROUND

1. Field

This invention relates to touchpads and more particularly relates to automated touchpad adjustments.

2. Description of the Related Art

Electronic devices such as notebook computers frequently use touchpads to receive spatial input. For example, a touchpad may be used to control a pointing device such as a cursor. A user may slide a finger across the touchpad to change the position of the cursor.

Touchpads are often positioned between the user and the keyboard. As a result, the user may unintentionally activate the touchpad. For example, the user's wrist may brush the touchpad while typing. During such times, it is often advantageous to reduce a touchpad sensitivity.

However, at other times, it may be advantageous to increase the sensitivity of the touchpad. For example, it may be advantageous to increase the touchpad sensitivity while the user is using the touchpad to navigate a website.

SUMMARY

From the foregoing discussion, there is a need for an apparatus, system, and method that automate touchpad adjustments. Beneficially, such an apparatus, system, and method would automatically adjust touchpad sensitivity.

The present invention has been developed in response to the present state of the art, and in particular, in response to the problems and needs in the art that have not yet been fully solved by currently available apparatus and methods for automated touchpad adjustments. Accordingly, the present invention has been developed to provide an apparatus, system, and method for automated touchpad adjustments that overcome many or all of the above-discussed shortcomings in the art.

The apparatus for automated touchpad adjustments is provided with a plurality of modules configured to functionally execute the steps of detecting a Touchpad Corrective Action (TCA) and decreasing touchpad sensitivity. These modules in the described embodiments include a TCA detection module and an adjustment module.

The TCA detection module detects a TCA within a specified input limit after a touchpad input. The adjustment module decreases touchpad sensitivity in response to detecting the TCA.

A system of the present invention is also presented for automated touchpad adjustments. The system may be embodied in electronic devices such as notebook computers, palmtops, or the like. In particular, the system, in one embodiment, includes a display, a touchpad, a TCA detection module, an Intentional Touchpad Action (ITA) detection module, and an adjustment module.

The TCA detection module detects a TCA within a specified input limit after a touchpad input. The ITA detection module detects a specified ITA.

The adjustment module decreases a touchpad sensitivity in response to detecting the TCA. Alternatively, the adjustment module increases the touchpad sensitivity in response to detecting the ITA.

A method of the present invention is also presented for automated touchpad adjustments. The method in the disclosed embodiments substantially includes the steps to carry out the functions presented above with respect to the operation of the described apparatus and system. In one embodiment, the method includes detecting a TCA and decreasing a touchpad sensitivity.

A TCA detection module detects a TCA within a specified input limit after a touchpad input. An adjustment module decreases a touchpad sensitivity in response to detecting the TCA.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automates touchpad adjustments. Beneficially, such an apparatus, system, and method would automatically detect the TCA within the specified input limit after the touchpad input and in response to detecting the TCA decrease the touchpad sensitivity. Alternatively, the apparatus, system, and method would automatically detect the ITA and in response to detecting the ITA increase the touchpad sensitivity. Thus, the present the present invention would beneficially adjust touchpad sensitivity by increasing or decreasing the touchpad sensitivity. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
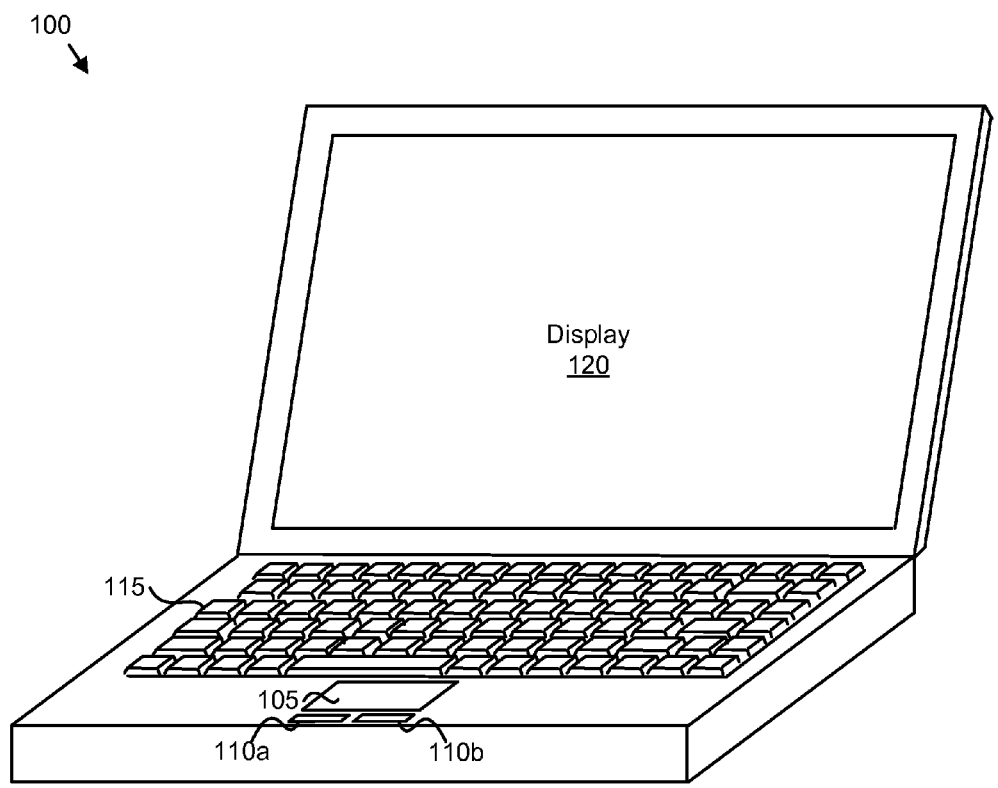
FIG. 1 is a perspective drawing illustrating one embodiment of a notebook computer in accordance with the present invention.

FIG. 1 is a perspective drawing illustrating one embodiment of a notebook computer 100 in accordance with the present invention. The notebook computer 100 includes a touchpad 105, a plurality of buttons 110a-b, a keyboard 115, and a display 120. Although, for simplicity, only one touchpad 105 and two (2) buttons 110a-b are shown with the notebook computer 100, any number of touchpads 105 and buttons 110a-b may be employed.

The touchpad 105, the plurality of buttons 110a-b, and the keyboard 115 may be configured as input devices. For example, a finger, thumb, palm, bangle, or the like may touch the touchpad 105 to cause spatial movements of a cursor on the display 120. The button 110a and the button 110b may execute left and right click button functions similar to a computer mouse respectively. The keyboard 115 may allow inputting characters, numerals, and/or the like.

The notebook computer 100 may include a plurality of processor modules, cache modules, memory modules, north bridge modules, south bridge modules, graphics modules, display modules, BIOS modules, network modules, Universal Serial Bus (USB) modules, audio modules, Peripheral Component Interconnect (PCI) modules, and storage modules (not shown). These modules, referred to herein as components, may be fabricated of semiconductor gates on one or more semiconductor substrates. Each semiconductor substrate may be packaged in one or more semiconductor devices mounted on circuit cards. Connections between some or all of the components may be through semiconductor metal layers, substrate-to-substrate wiring, circuit card traces, wires connecting the semiconductor devices, and/or wireless.

The memory module may store software instructions. The memory module may include a volatile memory such as a Dynamic Random Access Memory (DRAM), a non-volatile memory, or the like. The processor module may execute one or more computer program products. The processor module may communicate over an integrated circuit (IC) processor bus for example, of two Gigahertz (2 GHz) or the like. Computer program products may be tangibly stored in the storage module.

The display 120 may be configured as a liquid crystal display (LCD), a thin film transistor liquid crystal display (TFT-LCD), or the like. The display 120, keyboard 115, and plurality of buttons 110a-b may be configured on the notebook computer 100 as is well known to those of skill in the art.

The cursor on the display 120 may move in same direction as a motion of the finger moving on a surface of the touchpad 105. The touchpad 105 may also allow moving the finger along an edge of the touchpad 105 to act as a scroll wheel. The scroll wheel function of the touchpad 105 may allow controlling one or more scrollbars and/or scrolling a window on the display 120.

The touchpad 105 may be selected from a resistive touchpad, a capacitive touchpad, an electromagnetic touchpad, or the like of suitable size to fit in a recess in a body of the notebook 100. For example, the touchpad 105 configured as the capacitive touchpad may comprise an insulator plate (not shown) on top surface and a bottom substrate (not shown) formed with a conductor wiring of conductive materials such as metals, Indium Tin Oxide (ITO), or the like. The bottom substrate may be a printed circuit board, a membrane, a transparent substrate, or the like.

In another example, the touchpad 105 configured as the resistive touchpad may may comprise a bottom surface (not shown) and a flexible film (not shown) positioned above the bottom surface. The bottom surface and the flexible film may be separated by an air or vacuum gap. In addition, the bottom surface and the flexible film may be coated or covered with an electrically conductive material or a thin layer of electrically conductive material such as metals, ITO, or the like. A plurality of spacer dots, each made of an electrically insulating material may be located between the bottom surface and the flexible film. For example, the spacer dots may extend from the bottom surface to the flexible film. While in normal position the spacer dots may not touch the coated flexible film.

The touchpad 105 is generally positioned between a user and the keyboard 115. As a result, the user may unintentionally activate the touchpad 105 while using the keyboard 115 or the display 120. For example, the user's wrist may brush the touchpad 105 while typing. During such times, it is often advantageous to reduce the sensitivity of the touchpad 105. Alternatively, while the user is using the touchpad 105, for example to navigate a website, it may be advantageous to increase the sensitivity of the touchpad 105. The user may adjust touchpad sensitivity settings from time to time. For example, the user may decrease the touchpad sensitivity settings while mostly using the keyboard 115. However, manually changing sensitivity is cumbersome and inconvenient.

The present invention automatically increases or reduces the sensitivity of the touchpad 105 as will be described hereafter.

Figure 2:
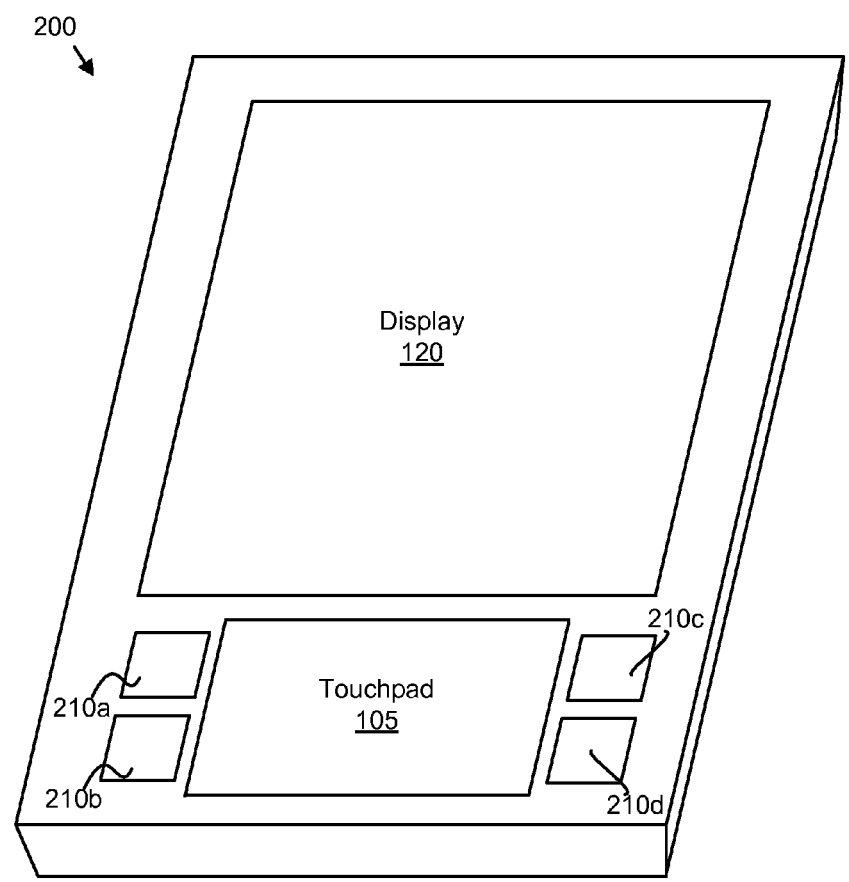
FIG. 2 is a perspective drawing illustrating one embodiment of a personal digital assistant (PDA) of the present invention.

FIG. 2 is a perspective diagram illustrating one embodiment of a PDA 200 in accordance with the present invention. The PDA 200 includes a touchpad 105, a plurality of buttons 210a-d, and a display 120. The description of the PDA 200 refers to elements of FIG. 1, like numbers referring to like elements. Although, for simplicity, only one touchpad touchpad 105 and four (4) buttons 210a-d are shown with the PDA 200, any number of touchpads 105 and buttons 210a-d may be employed.

The display 120 may be configured as a LCD, a TFT-LCD, a touchscreen, or the like. The display 120, the touchpad 105, and the plurality of buttons 210a-d may be configured on the PDA 200 as is well known to those of skill in the art.

In a particular example, the display 120 is configured as the touchscreen. The display 120 configured as the touchscreen may detect a location of a stylus, one or more fingers, or the like touching within a display area. Thus, the display 120 may be used as an input device, replacing the keyboard as the input device for interacting with content on the display 120. The display 120 configured as the touchscreen may be attached to one or more computers such as terminals, servers, or the like, networks, or the like.

The plurality of buttons 210a-d may allow the user to control a plurality of functions of the PDA 200 as is well known to those of skill in the art. For example, the button 210a may be used to power on or off the PDA 200. The button 210b may be configured as an "OK" button to enable the user to click or perform a suitable event. The touchpad 105 of the PDA 200 may be similar to the touchpad 105 of the notebook computer 100 of FIG. 1 and may allow inputting one or more spatial inputs and/or controlling movements of the cursor in the display 120.

Figure 3:
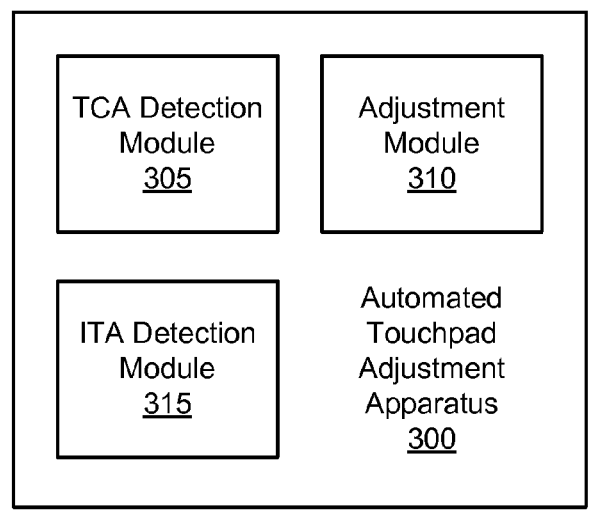
FIG. 3 is a schematic block diagram illustrating one embodiment of an automated touchpad adjustment apparatus of the present invention.

FIG. 3 is a schematic block diagram illustrating one embodiment of an automated touchpad adjustment apparatus 300 of the present invention. The apparatus 300 automates touchpad adjustment and can be embodied in the notebook computer 100 of FIG. 1 and the PDA 200 of FIG. 2. The description of apparatus 300 refers to elements of FIGS. 1-2, like numbers referring to like elements. The apparatus 300 includes a TCA detection detection module 305, and an adjustment module 310. The apparatus 300 may further include an ITA detection module 315.

The TCA detection module 305 detects a TCA within a specified input limit after a touchpad input. The touchpad input may include touching and moving a finger, two or more fingers, a thumb, or the like on an upper surface of the touchpad 105 for controlling spatial movements of a cursor on the display 120, tapping in a special corner of the touchpad 105, tapping with two or more fingers on the upper surface of the touchpad 105, moving the finger along a horizontal edge of the touchpad 105 to control a horizontal scrollbar or along a vertical edge of the touchpad 105 to control a vertical scrollbar, or the like.

The input limit may be selected from a specified time interval after the touchpad input and a specified number of inputs after the touchpad input. For example, the input limit may be five seconds (5 s) after the touchpad input. In another example, the input limit may be twenty (20) inputs to another input device such as the plurality of keys 110a-b of FIG. 1, the plurality of keys 210a-d of FIG. 2, the keyboard 115 of FIG. 1, or the like after the touchpad input.

The TCA detection module 305 may include computer useable medium having a computer readable program stored on a tangible storage device. The computer readable program is executed on a computer. In one embodiment, the computer useable medium is stored on a memory such as read only memory (ROM) and executed by the processor of the notebook 100 or the PDA 200.

The TCA may be selected from an undo command, a Control Z command, and a retyping of text. The undo command may be a command that may erase a latest change to a document. Thus, the undo command may revert the document to an older state.

The control Z command may be a control character in American Standard Code for Information Interchange (ASCII) or a substitute (SUB) character. The user may generate control Z command by pressing a Z key while holding down a Ctrl key on the keyboard 115. The retyping of text may comprise retyping certain previously typed text by the user.

The adjustment module 310 decreases a touchpad sensitivity in response to detecting the TCA. For example, the adjustment module 310 may decrease the touchpad sensitivity in response to detecting the Control Z command within five seconds (5 s) after the touchpad input.

The touchpad sensitivity may not be decreased below a minimum touchpad sensitivity. The minimum touchpad sensitivity may be selected from a range of zero point two five (0.25) to two (2) square centimeters and a range of one thousand five hundred (1500) to two thousand five hundred (2500) pascal. For example, the touchpad sensitivity may not be decreased below zero point two six (0.26) square centimeters. In another example, the touchpad sensitivity may not be decreased below two thousand four hundred ninety nine (2499) pascal.

The adjustment module 310 may include computer useable medium having a computer readable program stored on a tangible storage device. The computer readable program is executed on a computer. In one embodiment, the computer useable medium is stored on a memory such as read only memory (ROM) or a Flash Random Access Memory (RAM) and executed by the processor of the notebook 100 or the PDA 200.

The ITA detection module 315 may detect a specified ITA. The ITA may be selected from a specified number of uncorrected touchpad actions without an intervening TCA and a specified time interval of uncorrected touchpad actions without an intervening TCA. For example, the ITA may be hundred (100) uncorrected touchpad actions without the TCA. In another example, the ITA may be hundred seconds (100 s) of uncorrected touchpad actions without the TCA. The adjustment module 310 may further increase the touchpad sensitivity in response to detecting the ITA.

The ITA detection module 315 may include computer useable medium having a computer readable program stored on a tangible storage device. The computer readable program is executed on a computer. In one embodiment, the computer useable medium is stored on a memory such as read only memory (ROM) or Flash RAM and executed by the processor of the notebook 100 or the PDA 200.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method particular method occurs may or may not strictly adhere to the order of the corresponding steps shown.

Figure 4:
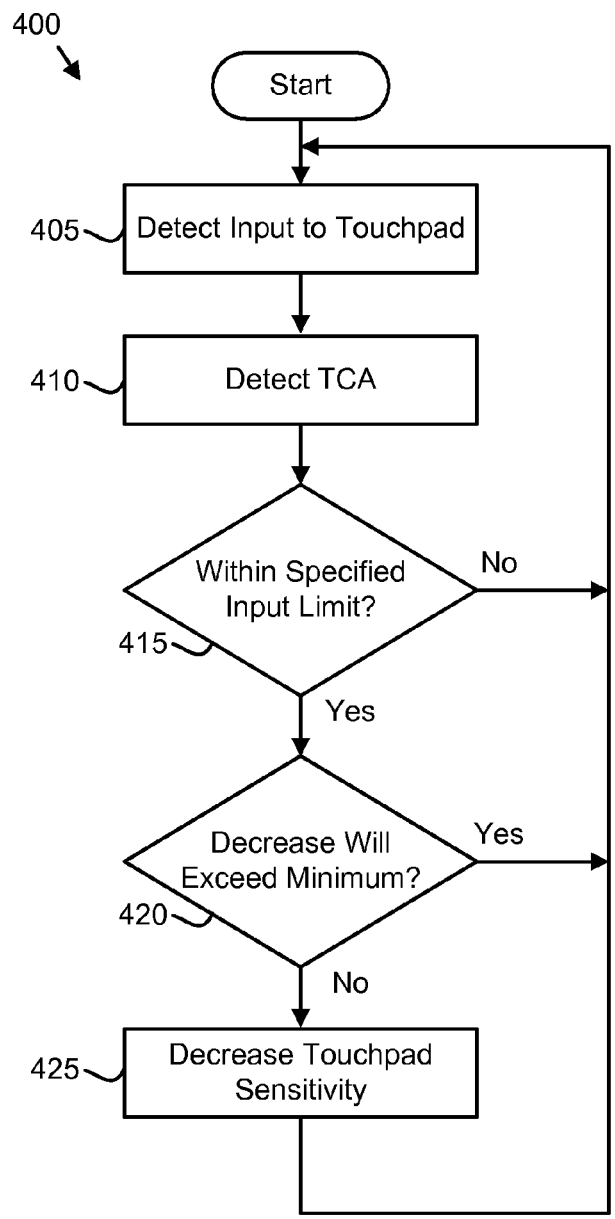
FIG. 4 is a schematic flow chart diagram illustrating one embodiment of a method for decreasing a touchpad sensitivity of the present invention.

FIG. 4 is a schematic flow chart diagram illustrating one embodiment of a method 400 for decreasing touchpad sensitivity of the present invention. The method 400 substantially includes the steps to carry out the functions presented above with respect to the operation of the described apparatus 300, PDA 200, and notebook computer 100 of FIGS. 3, 2, and 1 respectively. The description of method 400 refers to elements of FIGS. 1-3, like numbers referring to like elements. In one embodiment, the method 400 is implemented with a computer program product comprising a computer usable medium having a computer readable program stored on a tangible storage device. The computer readable program may be executed by a processor of the notebook computer 100 or PDA 200.

The method 400 begins, and in an embodiment, the TCA detection module 305 detects 405 the touchpad input. For example, when the user touches the upper surface, one or more corners, the horizontal edge or the vertical edge of the touchpad 105, or the like, the TCA detection module 305 may automatically detect 405 the touchpad input.

The TCA detection module 305 detects 410 the TCA. In an embodiment, the TCA is the undo command. For example, the TCA detection module 305 may detect 410 the TCA when the user clicks a graphical user interface (GUI) icon for the undo command as is well known to those of skill in the art. In another embodiment, the TCA is the Control Z command. For example, the TCA detection module 305 may detect 410 the TCA when the user presses the Z key while holding down the Ctrl key on the keyboard 115.

In one more embodiment, the TCA is retyping of text. For example, the TCA detection module 305 may detect 410 retyping of text when the user types at least one character such as a letter, a numeral, or the like or a group of characters such as letters, numerals, or the like that matches a last character or a last group of characters respectively.

The TCA detection module 305 detects 415 if the TCA is within the specified input limit after the touchpad input. The input limit may be the specified time interval after the touchpad input. For example, the TCA detection module 305 may automatically detect 415 the TCA within the specified time interval of five seconds (5 s) if the TCA occurs four seconds (4 s) after the touchpad input. In another example, the TCA detection module 305 may not detect 415 the TCA within the specified input limit if the TCA occurs twenty-five seconds (25 s) after the touchpad input.

Alternatively, the input limit may be the specified number of inputs after the touchpad input. For example, the TCA detection module 305 may automatically detect 415 the TCA within twenty (20) inputs, if the TCA occurs fifteen (15) inputs after the touchpad input. In another example, the TCA detection module 305 may not detect 415 the TCA within twenty (20) inputs if the TCA occurs twenty five (25) inputs after the touchpad input.

If the TCA detection module 305 does not detect 415 the TCA within the specified input limit after the touchpad input, the TCA detection module 305 further detects 405 the touchpad input. If the TCA detection module 305 detects 415 the TCA within the specified input limit after the touchpad input, the adjustment module 310 determines 420 if a decrease in the touchpad sensitivity exceeds the minimum touchpad sensitivity or not.

In an embodiment, a decrease in the touchpad sensitivity is selected from a range of zero point zero one (0.01) to zero point one (0.1) square centimeters and a range of hundred (100) to two hundred (200) pascal. For example, the decrease in the touchpad sensitivity may be zero point zero nine (0.09) square centimeters. In another example, the decrease in the touchpad sensitivity may be one hundred twenty (120) pascal.

In one embodiment, the decrease in touchpad sensitivity d is calculated by Equation 1, where k is a constant and n is the number of decreases taken. n will reset when the minimum touchpad sensitivity has been reached.

$$d = k^n \qquad \text{Equation 1}$$

The minimum touchpad sensitivity may be in the range of zero point two five (0.25) to two (2) square centimeters. Alternatively, the minimum touchpad sensitivity may be in the range of one thousand five hundred (1500) to two thousand five hundred five hundred (2500) pascal.

If the adjustment module 310 determines 420 the decrease in touchpad sensitivity exceeds the minimum touchpad sensitivity, the TCA detection module 305 further detects 405 the touchpad input without adjusting the touchpad sensitivity. For example, if the adjustment module 310 determines 420 the decrease of zero point one nine (0.19) square centimeters in the touchpad sensitivity may decrease 425 the touchpad sensitivity below the minimum touchpad sensitivity of the value of one point zero one (1.01) square centimeters, the TCA detection module 305 further detects 405 the touchpad input.

If the adjustment module 310 determines 420 the decrease in touchpad sensitivity does not exceed the minimum touchpad sensitivity, the adjustment module 310 decreases 425 the touchpad sensitivity in response to detecting the TCA. For example, if the adjustment module 310 determines 420 a decrease of one hundred twenty (120) pascal in the touchpad sensitivity does not exceed the minimum touchpad sensitivity of two thousand four hundred ninety nine (2499) pascal, the adjustment module 310 may decrease 425 the touchpad sensitivity by one hundred twenty (120) pascal. Thus, the method 400 automatically decreases 425 the touchpad sensitivity in response to detecting 405 the TCA within the specified input limit after the touchpad input.

Figure 5:
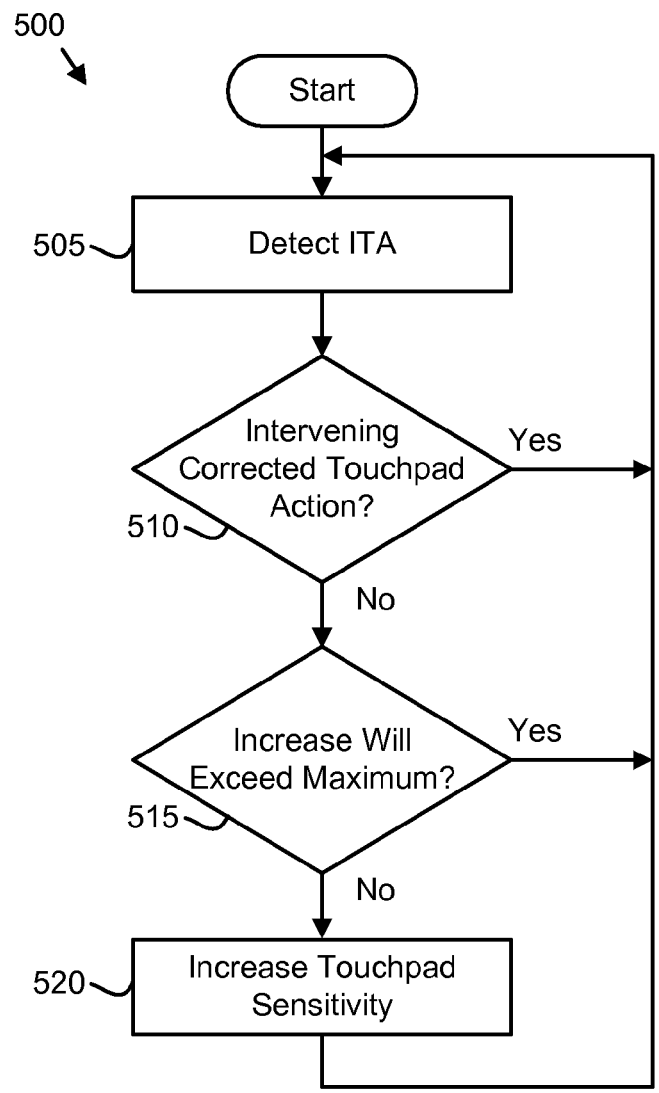
FIG. 5 is a schematic flow chart diagram illustrating one embodiment of a method for increasing the touchpad sensitivity of the present invention.

FIG. 5 is a schematic flow chart diagram illustrating one embodiment of a method 500 for increasing touchpad sensitivity of the present invention. The method 500 substantially includes the steps to carry out the functions presented above with respect to the operation of the described apparatus 300, PDA 200, and notebook computer 100 FIGS. 3, 2, and 1 respectively. The description of method 500 refers to elements of FIGS. 1-4, like numbers referring to like elements. In one embodiment, the method 500 is implemented with a computer program product comprising a computer usable medium having a computer readable program stored on a tangible storage device. The computer readable program may be executed by a processor of the notebook computer 100 or PDA 200.

The method 500 begins, and in an embodiment, the ITA detection module 315 detects 505 the specified ITA. In an embodiment, the specified ITA comprises the specified number of uncorrected touchpad actions without the TCA. For example, the ITA detection module 315 may detect 505 five (5) uncorrected touchpad actions without the TCA as the specified ITA. In a certain embodiment, the ITA may be in the range of 5 to one hundred (5-100) touchpad actions without an intervening TCA.

In another embodiment, the specified ITA comprises the specified time interval of uncorrected touchpad actions without the TCA. For example, the ITA detection module 315 may detect 505 twenty five seconds (25 s) of uncorrected touchpad actions without the TCA as the specified ITA. In a certain embodiment, the ITA may be in the range of ten to of ten to thirty (10-30) seconds without an intervening TCA.

The ITA detection module 315 further detects 510 an intervening TCA. For example, the detection module 315 may detect 510 the intervening TCA when the user retypes text after five (5) uncorrected touchpad actions without the TCA. In another example, the detection module 315 may not detect 510 the intervening TCA if the user does not use the undo command, the Control Z command, or the retyping of text after twenty five seconds (25 s) of uncorrected touchpad actions.

If the ITA detection module 315 detects 510 the intervening TCA, the ITA detection module 315 further detects 505 the specified ITA without adjusting the touchpad sensitivity. If the ITA detection module 315 does not detect 510 the intervening TCA, the adjustment module 310 may determine 515 if an increase in the touchpad sensitivity exceeds a maximum touchpad sensitivity or not.

For example, if the ITA detection module 315 does not detect 510 the intervening TCA, the adjustment module 310 may determine 515 a touchpad sensitivity increase of zero point one nine (0.19) square centimeters would exceed a maximum touchpad sensitivity of five point nine five (5.95) square centimeters. In another example, if the ITA detection module 315 does not detect 510 the intervening TCA, the adjustment module 310 may determine 515 a touchpad sensitivity increase of one hundred twenty (120) pascal would increase the touchpad sensitivity above a maximum touchpad sensitivity of nine thousand nine hundred (9900) pascal.

If the adjustment module 310 determines 515 the touchpad sensitivity exceeds the maximum touchpad sensitivity, the ITA detection module 315 further detects 505 the specified ITA without increasing touchpad sensitivity. For example, when the adjustment module 310 determines 515 an increase of zero point one nine (0.19) square centimeters in touchpad sensitivity would increase the touchpad sensitivity above the maximum touchpad sensitivity of five point nine five (5.95) square centimeters, the ITA detection module 315 may further detect 505 the specified ITA.

If the adjustment module 310 determines 515 that the increased touchpad sensitivity does not exceed the maximum touchpad sensitivity, the adjustment module 310 increases 520 the touchpad sensitivity in response to detecting the ITA. For example, when the adjustment module 310 determines 515 an increase of one hundred twenty (120) pascal in touchpad sensitivity would not increase the touchpad sensitivity above maximum touchpad sensitivity of the value of nine thousand nine hundred (9900) pascal, the adjustment module 310 may increase 520 the touchpad sensitivity by one hundred twenty (120) pascal. Thus, the method 500 automatically increases 520 the touchpad sensitivity on detecting 505 the ITA.

Figure 6A:
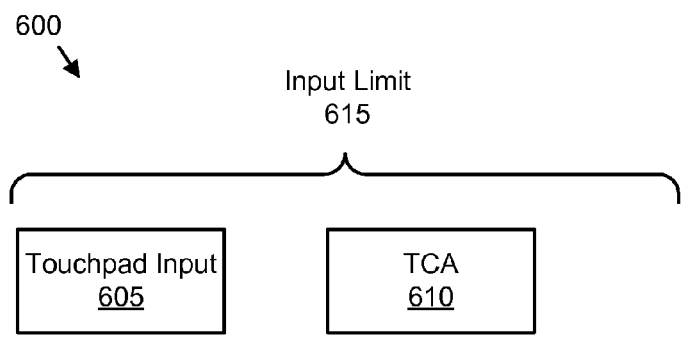
FIG. 6A is a schematic diagram illustrating one embodiment of detecting a touchpad corrective action (TCA) within an input limit after the present invention.

FIG. 6A is a schematic diagram 600 illustrating one embodiment of detecting a TCA within an input limit after the present invention. The diagram 600 is a prophetic example and is not to the scale. FIG. 6A includes a touchpad input 605, a TCA 610, and an input limit 615. The description of the diagram 600 refers to elements of FIGS. 1-5, like numbers referring to like elements.

In the shown embodiment, the input limit 615 is represented as a bracket. The representation of the input limit 615 as the bracket is only symbolic. The length under the bracket indicating the input limit 615 is not to the scale.

For example, the length of the input limit 615 may indicate an input limit of five seconds (5 s) after the touchpad input 605. In another example, the length of the input limit 615 may indicate an input limit of twenty (20) inputs after the touchpad input 605.

The touchpad input 605 is shown at a starting point of the input limit 605. For example, the TCA detection module 305 might detect 405 the touchpad input 605 when the user touches the upper surface of the touchpad 105.

Further, in the shown embodiment, the TCA 610 is within the input limit 615 represented as the bracket. The adjustment module 310 may decrease 425 the touchpad sensitivity in response to detecting the TCA, if the decreased touchpad sensitivity does not exceed the minimum touchpad sensitivity. Alternatively, the TCA detection module 305 may not decrease the touchpad sensitivity if the decreased touchpad sensitivity exceeds the minimum touchpad sensitivity. Thus, the present invention automates touchpad adjustments.

Figure 6B:
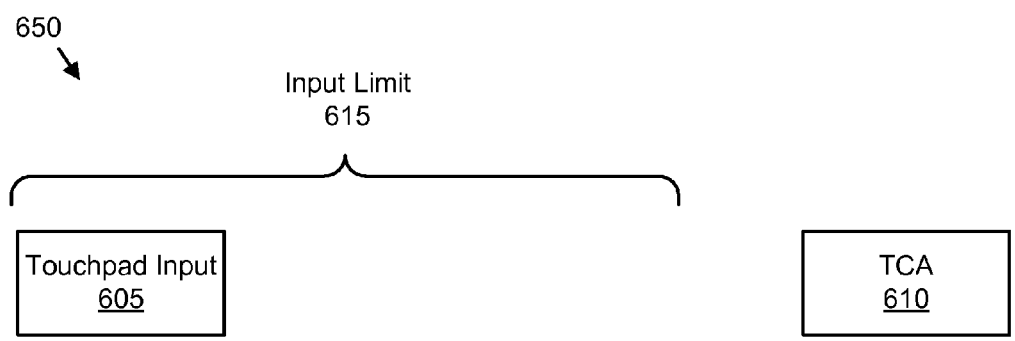
FIG. 6B is schematic diagram illustrating one embodiment of detecting the TCA outside the input limit of the present invention.

FIG. 6B is a schematic diagram 650 illustrating one embodiment of detecting the TCA not within the input limit after the present invention. The diagram 650 is a prophetic example and is not to the scale. FIG. 6B includes the touchpad input 605, the TCA 610, and the input limit 615. The description of the diagram 650 refers to elements of FIGS. 1-5 and 6A, like numbers referring to like elements.

In the shown embodiment, the TCA 610 is not within the specified input limit 615. The TCA detection module 305 may not reduce the touchpad sensitivity on not detecting 415 the TCA 610 within the specified input limit 615. Thus, the present invention automates touchpad adjustments.

The present invention automates touchpad adjustments. Beneficially, such an apparatus, system, and method automatically detects the TCA 610 within the specified input limit 615 of the touchpad input 605 and in response to detecting the TCA 610 decrease 425 the touchpad sensitivity. Alternatively, the apparatus, system, and method may automatically detect the ITA and in response to detecting the ITA increase 520 the touchpad sensitivity. Thus, the present invention would beneficially adjust touchpad sensitivity by increasing or decreasing the touchpad sensitivity to accommodate a user's input actions. For example, the touchpad sensitivity may be automatically decreased as a result of inadvertent touchpad inputs 605 while the user is typing. Similarly, the touchpad sensitivity may be automatically increased while the user employs the touchpad to navigate a GUI.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory storage device having a computer readable program, wherein the computer readable program when executed on a device causes the device to: detect a Touchpad Corrective Action (TCA) comprising receiving a sequence of a touchpad input, followed by less than a specified number of inputs to keyboard keys, followed by an undo command, wherein the specified number of inputs is greater than one; and decrease a touchpad sensitivity in response to detecting the TCA.

2. The computer program product of claim 1, wherein the sequence further comprises receiving the undo command following less than specified time interval after the touchpad input.

3. The computer program product of claim 1, wherein the touchpad sensitivity is not decreased below a minimum touchpad sensitivity.

4. The computer program product of claim 3, wherein the minimum touchpad sensitivity is selected from a range of one to two square centimeters and a range of 1500 to 2500 pascal.

5. The computer program product of claim 1, wherein the undo command further comprises a Control Z command.

6. The computer program product of claim 1, wherein the sequence further comprises a retyping of text following the undo command.

7. The computer program product of claim 1, wherein the computer readable program is further configured to cause the device to detect a specified Intentional Touchpad Action (ITA); and increase the touchpad sensitivity in response to detecting the ITA.

8. The computer program product of claim 7, wherein the specified ITA comprises a specified number of uncorrected touchpad actions without an intervening TCA.

9. The computer program product of claim 7, wherein the specified ITA comprises a specified time interval of uncorrected touchpad actions without an intervening TCA.

10. The computer program product of claim 1, wherein the computer readable program is further configured to cause the device to decrease the touchpad sensitivity by a value selected from a range of 0.025 to 0.2 square centimeters and a range of from 100 to 200 pascal.

11. An apparatus comprising: a Touchpad Corrective Action (TCA) detection module detecting a TCA comprising receiving a sequence of a touchpad input, followed by less than a specified number of inputs to keyboard keys, followed by an undo command, wherein the specified number of inputs is greater than one; and an adjustment module decreasing a touchpad sensitivity in response to detecting the TCA.

12. The apparatus of claim 11, wherein the sequence further comprises receiving the undo command following less than a specified time interval after the touchpad input.

13. The apparatus of claim 11, wherein the touchpad sensitivity is not decreased below a minimum touchpad sensitivity and the minimum touchpad sensitivity is selected from a range of zero point two five to two square centimeters and a range of 1500 to 2500 pascal.

14. The apparatus of claim 11, wherein the sequence further comprises, a retyping of text following the undo command.

15. The apparatus of claim 11, further comprising
an Intentional Touchpad Action (ITA) detection module detecting a specified ITA; and
the adjustment module further increasing the touchpad sensitivity in response to detecting the ITA.

16. The apparatus of claim 15, wherein the ITA is selected from a specified number of uncorrected touchpad actions without an intervening TCA and a specified time interval of uncorrected touchpad actions without an intervening TCA.

17. A system comprising: a display; a touchpad; a Touchpad Corrective Action (TCA) detection module detecting a TCA comprising receiving a sequence of a touchpad input, followed by less than a specified number of inputs to keyboard keys, followed by an undo command, wherein the specified number of inputs is greater than one; an Intentional Touchpad Action (ITA) detection module detecting a specified ITA; and an adjustment module decreasing a touchpad sensitivity in response to detecting the TCA and increasing the touchpad sensitivity in response to detecting the ITA.

18. The system of claim 17, wherein the system is configured as a notebook computer.

19. The system of claim 17, wherein the touchpad sensitivity is not decreased below a minimum touchpad sensitivity and the minimum touchpad sensitivity is selected from a range of zero point two five to two square centimeters and a range of 1500 to 2500 pascal.

* * * * *